June 23, 1959 J. F. REUTHER ET AL 2,892,102
FREQUENCY HALVER
Filed June 22, 1956
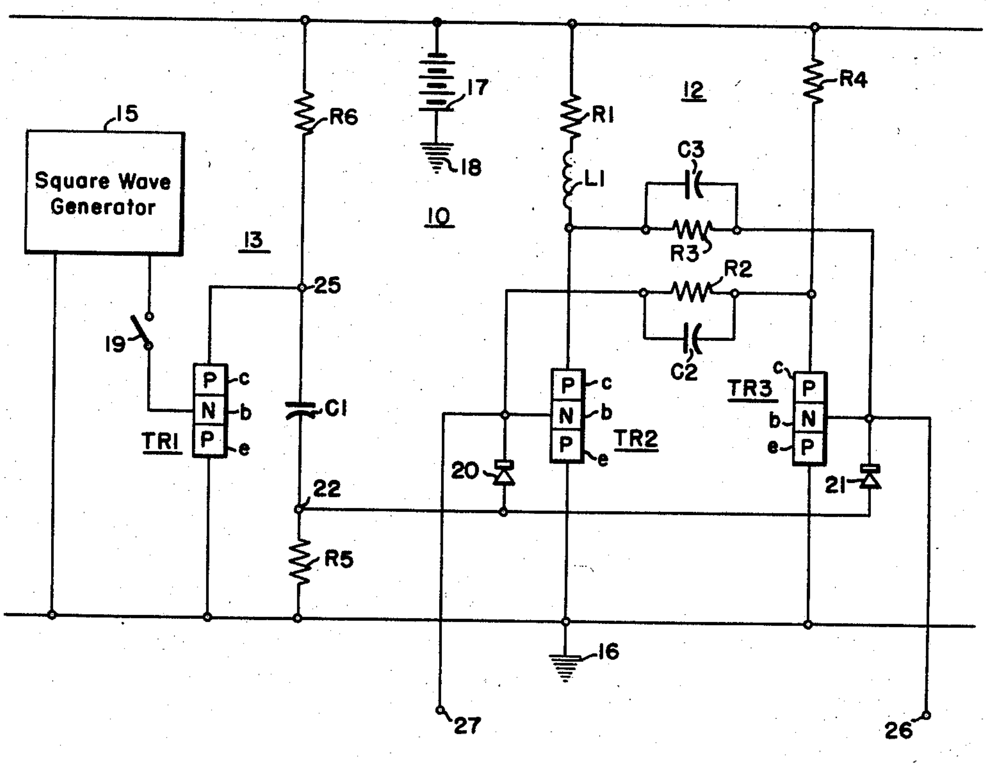
WITNESSES
Edwin E. Bassler
Leon J. Taga
INVENTORS
John F. Reuther &
Sheldon D. Silliman
BY
Francis V.B. Giolma
ATTORNEY United States Patent Office 2,892,102

Patented June 23, 1959

2,892,102

FREQUENCY HALVER

John F. Reuther, Swissvale, and Sheldon D. Silliman, Forest Hills, Pa., assignors to Westinghouse Electric Corporation, East Pittsburgh, Pa., a corporation of Pennsylvania Application June 22, 1956, Serial No. 593,260

1 Claim. (Cl. 307—88.5)

Our invention relates generally to static element devices, and it has reference, in particular, to a transistor frequency halver.

Generally stated, it is an object of our invention to provide for using semiconductor devices to furnish a frequency halver that is simple and inexpensive to build and is reliable in operation.

More specifically, it is an object of our invention to provide for operating a Flip-Flop memory circuit from one stable state to another in response to successive signals.

Another object of our invention is to provide for modifying a transistor Flip-Flop circuit so that it transfers alternately from one stable state to another in response to successive signals of like character.

Yet another object of our invention is to provide a static element frequency halver that utilizes only a single source of bias voltage.

Still another object of our invention is to provide a static element frequency halver circuit which can be used in counters, timers, computers or the like.

It is also an object of our invention to provide for triggering a Flip-Flop circuit from one stable state to another so as to produce a square wave output pulse in response to alternate square wave input pulses.

An important object of our invention is to provide in a bistable semiconductor multivibrator circuit for using a common trigger circuit for simultaneously applying pulses to both semiconductor devices to successively trigger the circuit from one stable state to another.

Other objects will, in part, be obvious and will, in part, be explained hereinafter.

In practicing our invention, in accordance with one of its embodiments, a pair of transistors are cross-connected to provide a static bistable multivibrator. A trigger circuit is used therewith to convert square wave pulses into short trigger pulses, which are applied simultaneously through rectifiers to the base electrodes of the transistors to block the one which is saturated and trigger the multivibrator to its other stable state so as to produce a square wave output pulse for every other square wave pulse applied to the trigger circuit.

For a more complete understanding of the nature and scope of our invention, reference may be made to the following detailed description, which may be read in connection with the accompanying drawing in which the single figure is a schematic diagram of a frequency halver embodying the invention in one of its forms.

Referring to the drawing, the reference numeral 10 denotes generally a scale-of-two Flip-Flop or a frequency halver comprising a Flip-Flop circuit 12 which is alternately triggered from one stable state to another by means of a trigger circuit 13 to which is applied a square wave signal from a square wave generator 15.

The Flip-Flop circuit 12 may comprise a pair of transistors TR2 and TR3 having their emitters *e* connected to ground at 16 and their collectors *c* connected to the negative terminal of a direct current source such as the battery 17, which has its positive terminal connected to ground at 18. The collectors *c* are connected to the battery 17 through collector resistors R1 and R4. The base electrode *b* of each transistor is connected to the collector *c* of the other transistor through collector resistors R2 and R3, respectively, so as to provide a multivibrator circuit. The resistors R2 and R3 are shunted by capacitors C2 and C3 for a purpose which will be explained hereinafter. An inductance device L1 is connected in circuit with the collector *c* of transistor TR2 and the battery 17 to delay current flow and determine the initial state of the Flip-Flop circuit 12.

The trigger circuit 13 comprises a capacitor C1 which is connected in circuit with the battery 17 and in shunt with transistor TR2 through resistors R6 and R5. A transistor TR1 is connected in shunt with the capacitor C1 and the resistor R5 to provide a discharge circuit for the capacitor. A square wave generator 15 of any suitable type is connected between the base electrode *b* of the transistor TR1 and ground through a switch 19 to provide for effecting saturation of the transistor TR1 to discharge the capacitor C1. Rectifier devices 20 and 21 are connected between the base electrodes *b* of the transistors TR2 and TR3 and a point 22 intermediate the capacitor C1 and the resistor R5 to couple the discharge circuit of the capacitor to the Flip-Flop circuit 12 for triggering the Flip-Flop circuit 12 from one stable state to the other.

When power is first applied the inductance device L1 delays the flow of current to the base electrode *b* of transistor TR3, allowing transistor TR2 to saturate, so that the output terminal 26 is almost at ground potential, while the output terminal 27 is at a negative potential, and the Flip-Flop is in its off state. The base current of TR2 causes a voltage drop across resistor R2, and capacitor C2 is charged with its left-hand terminal being positive, while the capacitor C3 remains uncharged. The condenser C1 meanwhile charges through resistors R5 and R6.

When the switch 19 connecting the square wave generator 15 to the base electrode *b* of transistor TR1 is closed, and a square wave pulse is applied to the base electrode of transistor TR1 making the base *b* negative with respect to the emitter *e*, it causes TR1 to saturate and connect the point 25 to ground. The capacitor C1 discharges through resistor R5 and the transistor TR1, to provide a relatively short trigger pulse on the order of one microsecond, which is applied to the base electrodes *b* of the transistors TR2 and TR3 through the rectifier devices 20 and 21, respectively. This pulse opposes and drives the base current of transistor TR2 to zero. As the collector *c* of transistor TR2 becomes negative and approaches battery potential, charging current in the capacitor C3 helps to saturate transistor TR3, while the charge on capacitor C2 together with the change in voltage on the collector *c* of transistor TR3 which is becoming more positive, keeps the base *b* of a transistor TR2 momentarily positive, so as to aid the change to the "on" state.

When the square wave pulse is removed from the transistor TR1, and during a pulse which makes the base *b* positive, the transistor is blocked, and the capacitor C1 recharges. The next square wave pulse which drives the base *b* of TR1 negative, by similar action causes the capacitor C1 to discharge and trigger the Flip-Flop circuit 12 back to the "off" state. The output at terminal 26 is a set of square wave pulses of half the frequency of that of the square wave generator 15.

A frequency halver embodying the features of the invention has been successfully operated utilizing the following values of circuit elements:

| | | |
|---|---|---|
| Resistors R1 and R4 | ohms | 1,000 |
| Resistors R2 and R3 | do | 680 |
| Resistor R6 | do | 10,000 |
| Resistor R5 | do | 100,000 |
| Capacitors C1, C2 and C3 | mfd | .001 |
| Transistors TR1, TR2 and TR3 | | Type SB-100 |
| Rectifiers 20 and 21 | | Type 1N34A |

From the above description and the accompanying drawing it will be apparent that we have provided in a simple and effective manner for producing a square wave output of half the frequency of the input. A frequency halver or scale-of-two Flip-Flop embodying the features of our invention is applicable to counters, timers, computers and the like, and works equally well with a bias voltage of either −3 volts or −1.5 volts, only a single source of bias voltage being needed. Since all the elements thereof are static, the circuit is reliable and inexpensive to maintain.

While specific values of resistors and types of transistors have been given it is understood that other values and other types such as the contact type, fused alloy function and other similar types may also be used.

Since certain changes may be made in the above described construction, and different embodiments of the invention may be made without departing from the spirit and scope thereof, it is intended that all the matter contained in the above description and shown in the accompanying drawing shall be considered as illustrative and not in the limiting sense.

We claim as our invention:

A frequency halver comprising, a multivibrator having a pair of transistors with grounded emitters and cross-connected base electrodes and collectors, impedance means connecting the collectors to a negative voltage source, inductance means connected in series with one of said collectors, a trigger circuit having a capacitor, impedance means connecting the capacitor to said source, a transistor switch having its collector and emitter connecting it in shunt with the capacitor and at least a part of the impedance means connecting it to the source to provide a discharge circuit for the capacitor and having its base-emitter circuit adapted to be energized only by a control source, and circuit means including unidirectional devices connecting the discharge circuit to the base electrodes of the multivibrator transistors.

References Cited in the file of this patent

UNITED STATES PATENTS

| | | |
|---|---|---|
| 2,524,691 | Bliss | Oct. 3, 1950 |
| 2,569,345 | Shea | Sept. 25, 1951 |
| 2,611,085 | Masson | Sept. 16, 1952 |
| 2,622,212 | Anderson et al. | Dec. 16, 1952 |
| 2,681,996 | Wallace | June 22, 1954 |

FOREIGN PATENTS

| | | |
|---|---|---|
| 745,483 | Great Britain | Feb. 29, 1956 |

OTHER REFERENCES

Proceedings of the IRE, Non-Saturating Pulse Circuits, July 1955, pp. 826–833.